Oct. 30, 1934.  E. WILDHABER  1,978,924
METHOD OF AND MEANS FOR CUTTING GEARS
Filed Sept. 8, 1931   3 Sheets-Sheet 1
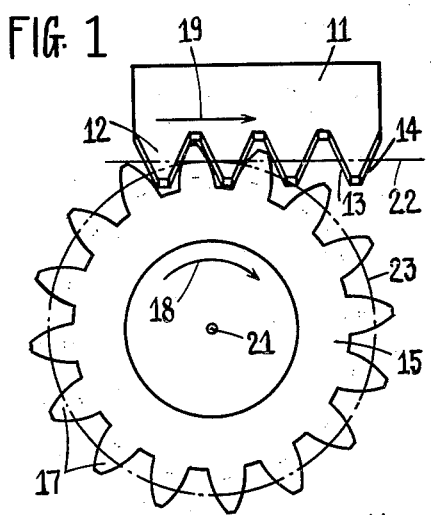
FIG. 1
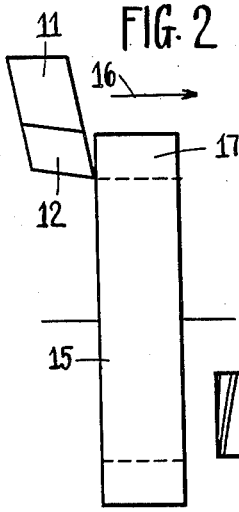
FIG. 2
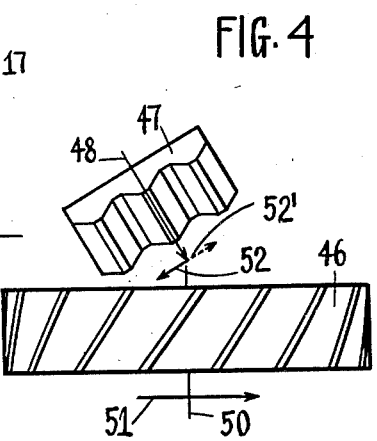
FIG. 4
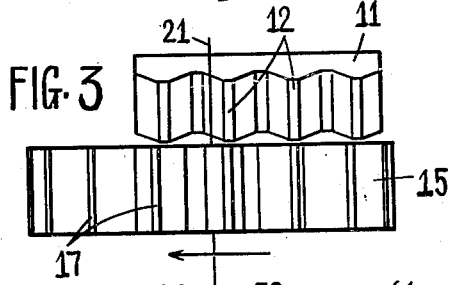
FIG. 3
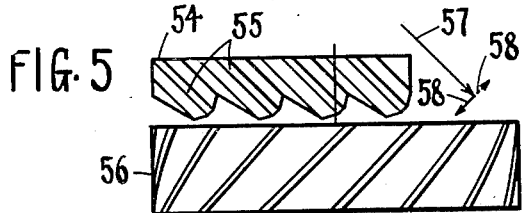
FIG. 5
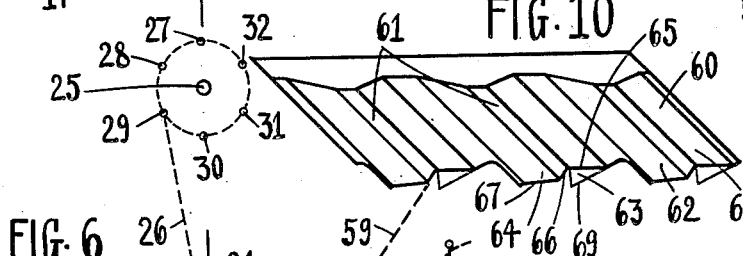
FIG. 10
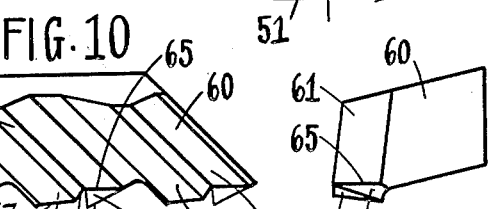
FIG. 11
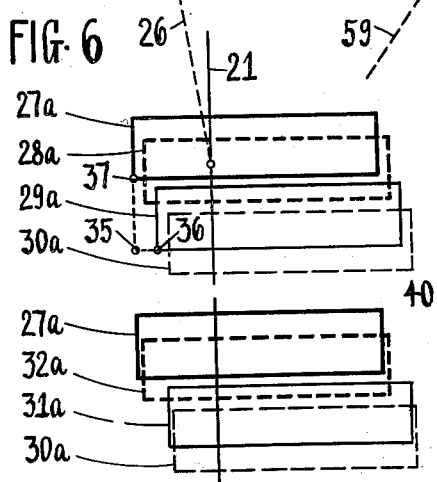
FIG. 6
FIG. 7
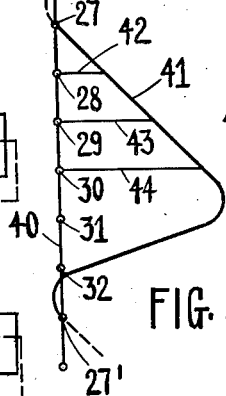
FIG. 8
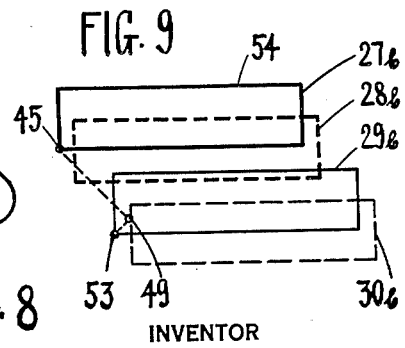
FIG. 9
INVENTOR
Ernest Wildhaber Oct. 30, 1934.  E. WILDHABER  1,978,924
METHOD OF AND MEANS FOR CUTTING GEARS
Filed Sept. 8, 1931  3 Sheets-Sheet 2
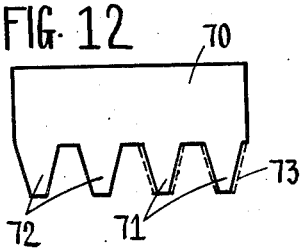
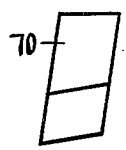
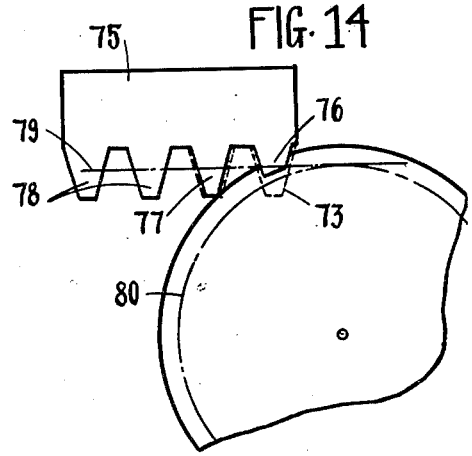
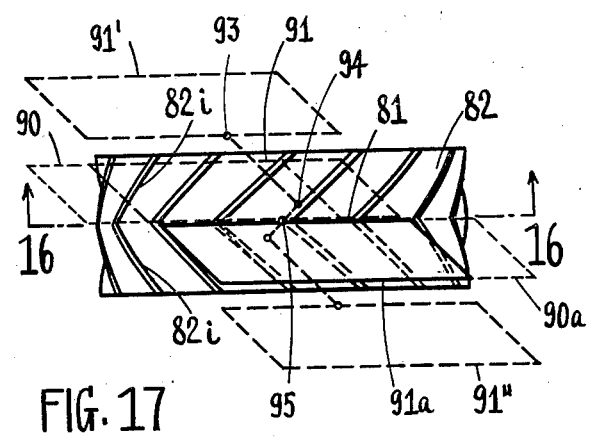
INVENTOR
Ernest Wildhaber

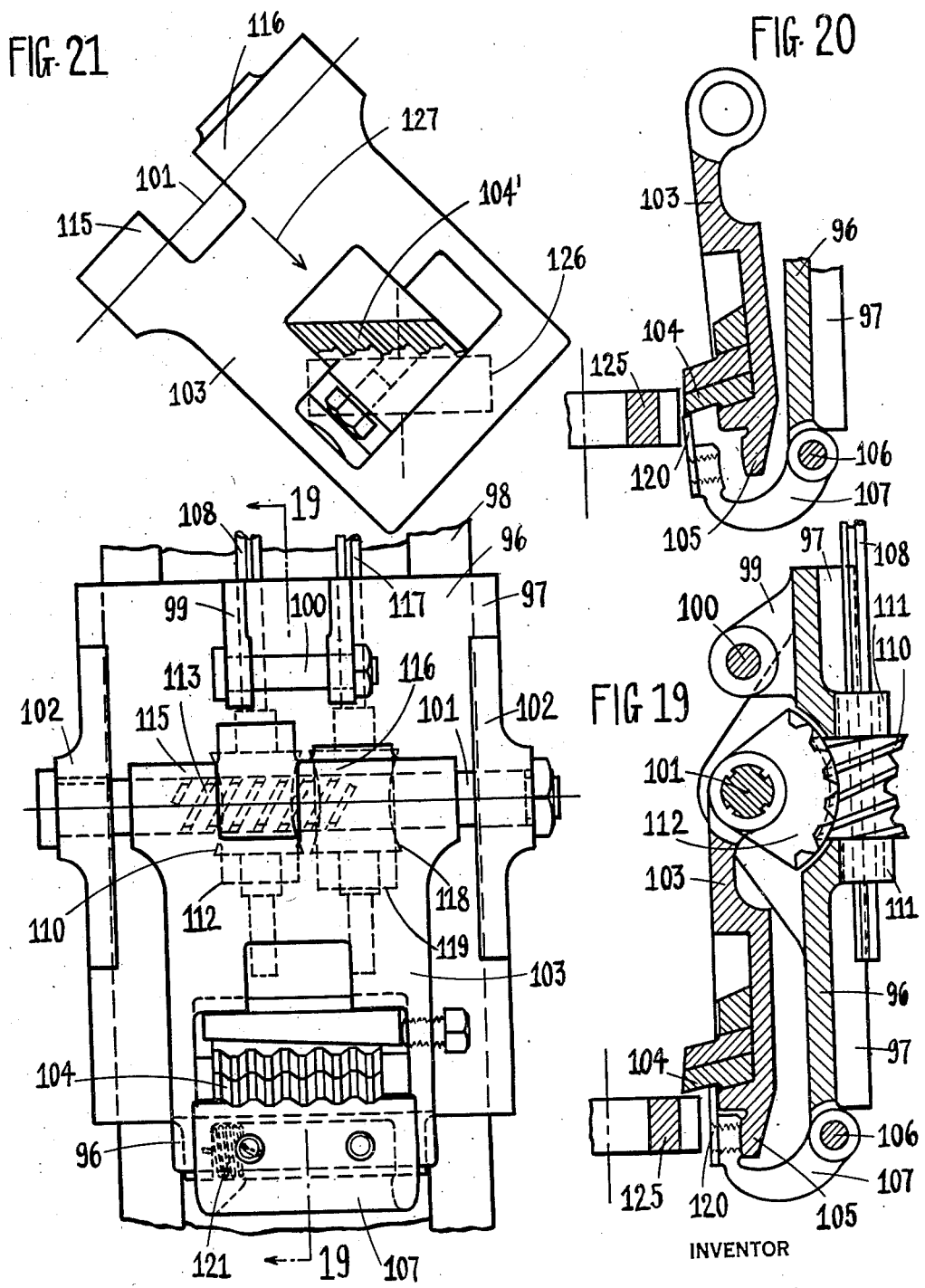

Patented Oct. 30, 1934

1,978,924

UNITED STATES PATENT OFFICE 1,978,924

METHOD OF AND MEANS FOR CUTTING GEARS

Ernest Wildhaber, Brooklyn, N. Y.

Application September 8, 1931, Serial No. 561,539

14 Claims. (Cl. 90—9)

The present invention relates to methods of and means for cutting gears. It applies to the production of gears in general, and particularly to the production of spur gears, helical gears and herringbone gears.

One object of the present invention is to devise an efficient method of producing very accurate gears, in a process, in which a gear blank is continuously indexed.

Another object is to devise a method of the above said character, which lends itself equally well to the production of gears having standard addenda and of gears having lengthened or shortened addenda, such as may be provided in order to retain all the inherent advantages of a gear drive.

A further aim in view is to provide a gear cutting method which can be carried out with a simple tool of rack form.

The existing methods which comply with the aims so far enumerated, require considerable space on both sides of the gear teeth, namely for the tools to run out.

An important object of the present invention is to do away with this drawback, and to provide a method of and means for cutting gears in a reciprocatory process of the above said character, which permits to cut close to shoulders, which utilizes a maximum of the total tool stroke, and which even permits to cut herringbone gears having continuous teeth.

A still other object is to devise an efficient method of cutting herringbone gears having continuous teeth more inclined to the direction of the gear axis than has hitherto been practically possible, and to provide herringbone gears having improved smoothness of operation.

Another object is to provide a process of gear cutting, in which the cutting teeth of the tool are cleaned on their cutting faces and honed after each cutting pass.

Still other aims in view are to provide tools for and other means for carrying out my novel process, and tools for successively roughing and finish cutting gears in a single operation of the above said character.

Other objects in view will appear in the course of the specification and from recital of the appended claims.

In the accompanying drawings

Fig. 1 is a view of a finished spur gear in relation with a rack shaped tool, explanatory of some of the principles underlying the present invention, the view being taken along the gear axis.

Fig. 2 is a side view corresponding to Fig. 1.

Fig. 3 is a front view also corresponding to Fig. 1.

Fig. 4 is a diagrammatic front view similar to Fig. 3, and referring to one way of producing helical gears in accordance with the present invention.

Fig. 5 is a diagrammatic front view similar to Fig. 4, and referring to a modified way of producing helical gears.

Fig. 6 is a diagram corresponding to Fig. 3, and further illustrative of the tool motions during the cutting stroke.

Fig. 7 is a diagram corresponding to Fig. 6, and illustrative of the tool motions during the return stroke or reversal of the cutting stroke.

Fig. 8 is a diagram further illustrative of the lateral tool motion provided in accordance with the present invention.

Fig. 9 is a diagram illustrative of tool motions such as may be used for producing helical gears in accordance with the present invention.

Fig. 10 is a front view of a tool rack form, such as may be used for producing helical gears and herringbone gears in accordance with the present invention.

Fig. 11 is a side view corresponding to Fig. 10.

Fig. 12 is a plan view of a rack shaped tool constructed according to the present invention, as may be employed for successively roughing and finishing gears in one operation.

Fig. 13 is a side view corresponding to Fig. 12.

Fig. 14 is a plan view of a tool slightly modified as compared with the tool shown in Fig. 12, and shown in engagement with a blank.

Fig. 15 is a diagram illustrative of a way of cutting herringbone gears in accordance with the present invention, and showing the path of a cutting tool as accomplished with a novel arrangement of feeding motion.

Fig. 16 is a sectional view of the central plane of a herringbone gear, along lines 16—16 of Fig. 17, and a diagram illustrative of tool positions.

Fig. 17 is a diagrammatic front view corresponding to Fig. 16.

Fig. 18 is a front view of a reciprocatory tool slide for gear cutting machines, such as may be used in carrying out my new process.

Fig. 19 is a side view and section along lines 19—19 of Fig. 18.

Fig. 20 is a partial view similar to Fig. 19 and illustrative of a different position of the tool holder.

Fig. 21 is a front view of parts of a tool slide, which is set for cutting helical or herringbone gears.

In Figures 1 to 3, numeral 11 denotes a reciprocatory tool having cutting teeth 12 arranged in a straight row. The cutting edges 13, 14 of said cutting teeth extend along lines of the tooth sides of a rack conjugate to spur gear 15.

In Fig. 2 and Fig. 3, the tool 11 is shown at the beginning of a cutting stroke.

In accordance with the present invention, tool 11 is reciprocated in the direction 16 of the teeth of said rack, which is also the direction of the teeth 17 of spur gear 15. In this respect the present method is similar to a known process of cutting spur gears with a rack tool, whereby the blank is periodically indexed by one tooth. It differs from said known process by providing a continuous indexing motion of gear blank 15. Preferably the blank is turned on its axis at a uniform velocity such that it is indexed by one tooth per complete reciprocation of tool 11. The tool then engages successive gear teeth in successive strokes.

Furthermore a lateral displacement is provided between the tool and blank, so namely that the rack represented by the tool is kept in mesh with the teeth of the continuously rotating gear to be cut from the blank. Preferably this lateral displacement is imparted to the tool. When the gear blank is rotated in the direction of arrow 18, then the tool should be displaced in the direction of arrow 19, at a rate of one pitch per complete reciprocation of the tool, or broadly at a rate of so many rack teeth as the blank is rotated per complete reciprocation of the tool.

Uniform motion of the blank requires an also uniform lateral motion of the tool, during the cutting stroke.

The lateral motion of the tool is preferably reversed after each cutting stroke, namely during the return stroke, when the tool is out of engagement with the gear blank.

In addition to the described motions of the tool and blank, feeding motion is provided between the tool and blank in a manner that the tooth surfaces of the gear blank are completely enveloped by the cutting edges of the tool.

There are various ways of providing feeding motions on methods operating in accordance with the present invention. One way consists in providing linear feeding motion in tangential direction, that is to say the direction of arrow 19 (or in a direction opposite to arrow 19), and in correspondingly turning the blank on its axis. In other words the feeding motion may consist of a linear motion and of a turning motion about the blank axis 21, in the manner of a gear (15) and a rack (11) meshing with each other. The pitch line 22 of the rack thereby rolls on the pitch circle 23 of the gear. Other feeding arrangements will be described hereafter.

The feeding motions are performed very slowly and preferably continuously, and the means for obtaining them are obvious from the state of the art.

As gear 15 continuously rotates, tool 11 engages other teeth in each stroke, so that a complete revolution of the blank corresponds to as many cutting strokes as there are teeth in the gear blank 15. After a complete revolution of the gear blank, the said tangential feed may have covered a distance of a small fraction of a pitch, such as for instance a tenth ($\frac{1}{10}$) or a twentieth ($\frac{1}{20}$) of a pitch, or if so desired something like ($\frac{2}{11}$), or ($\frac{2}{21}$), or ($\frac{3}{21}$), of a pitch.

The latter arrangements may be used, when it is desired to apply a coarse finish with one cutting edge and to smooth up said finish with a subsequent cutting edge. Subsequent cutting edges then namely cut in slightly different positions.

Furthermore, the blank is additionally turned in correspondence with said linear feed, as already pointed out.

The tool motions during a cutting stroke are further illustrated in diagram Fig. 6; and Fig. 7 shows the tool motions during the return stroke, while the cutting tool is out of engagement with the gear blank.

In these two figures, tool positions are indicated, which correspond to equal time intervals. The reciprocatory motion of the tool may be effected for instance by a crank having a turning center 25, and imparting motion to a tool slide by means of a connecting rod 26. In Fig. 6 the tool positions are indicated for turning positions 27, 28, 29, 30 of the crank, which are spaced apart a turning angle of sixty degrees, or one sixth of a complete revolution. In Fig. 7 the tool positions are indicated for turning positions 30, 31, 32, 27 of the crank. In both figures, the gear blank is indicated only by its axis 21.

The tool is moved at a changing rate in the direction of the gear teeth, which in the present instance coincides with the direction of the gear axis 21. The tool is indicated with its outline only. Tool position 27a, indicated in full lines, corresponds to crank position 27 and illustrates the beginning of the cutting stroke. Tool positions 28a, 29a, 30a correspond to crank positions 28, 29, 30 respectively. In the tool position 28a indicated in dotted lines, the tool is displaced laterally a distance equal to one sixth of a pitch, while it has completed less than one third of its cutting path. In the tool position 29a indicated in full lines, the tool is displaced laterally a distance 35—36 equal to two sixths, or one third of a pitch, whereas it has completed a distance 37—35 more than two thirds of its cutting path. At the end of the cutting stroke, tool position 30a shown in dotted lines, the tool is displaced laterally a distance equal to one half of a pitch. In this position of reversal of the tool motion, the tool starts to be withdrawn from the gear blank. The lateral motion of the tool also starts to be slowed down and then reversed, so that the departure from uniform motion starts at tool position 30a or a little later.

The tool positions 30a, 31a, 32a, 27a indicated in Fig. 7 correspond to crank positions 30, 31, 32, 27 respectively, which show the reversal of the lateral tool motion during the return stroke of the tool. The reversal of the lateral tool motion is performed at a faster rate than the uniform lateral motion during the cutting stroke. The reversal of said motion is completed before tool position 27a is reached, that is to say before the cutting stroke begins. In tool position 27a the tool must be moving laterally already at the aforesaid uniform rate of one pitch per complete reciprocation of the tool. Needless to say, the cutting tool is brought forward into cutting range before the cutting stroke starts anew, as indicated in side view Fig. 2.

The lateral tool motion further illustrated in Fig. 8 applies to the production of helical and herringbone gears as well as to the production of spur gears. Line 40 contains the developed circular path of a tool crank, having crank positions marked 27, 28, 29, 30, 31, 32, 27'. Distance 27—27' corresponds to a complete revolution of the tool crank, whereas the distance between any two adjacent positions correspond to a sixth of a revolution. Curve 41 illustrates on an enlarged scale the lateral tool positions at any crank positions. At the end of the cutting stroke, crank position 30, the lateral position of the tool is a distance denoted with numeral 44. Distances 42, 43 at crank positions 28, 29 are seen to be one third and two thirds of distance 44, inasmuch as the lateral distances are in direct proportion to the turning angle of the crank, on the cutting stroke. Line 41 is entirely straight at the portion corresponding to the cutting stroke 27—30.

The production of helical gears and herringbone gears will now be described. In Fig. 4, numeral 46 denotes a helical gear such as may be produced by tool 47. Tool 47 is similar to tool 11 and is set at an angle to the periphery of gear blank 46. The gear is continuously rotated on its axis 50, preferably at a rate of one pitch per complete reciprocation of the tool. Tool 47 is reciprocated in the direction 48 of the teeth of a rack conjugate to gear 46 and meshing with said gear. The tool is furthermore moved laterally during the cutting stroke, and this lateral motion is reversed during the return stroke of the cutting tool, as described with reference to the production of spur gears. Preferably the tool is moved in a direction perpendicular to the teeth of said rack, that is to say also perpendicular to the direction of its reciprocation, in the manner of said rack keeping in mesh with the teeth of the continuously rotating gear blank. The lateral or transverse motion of the tool is therefore in a direction inclined to the periphery of the gear blank.

If the gear is continuously rotated in the direction of arrow 51, which applies to the near portion of gear 46, then the tool is displaced laterally in the direction of arrow 52, namely at a uniform rate equal to one (normal) pitch measured in the direction of displacement, per complete reciprocation of the tool, when the gear blank is continuously indexed by one tooth during the same time. If so desired, gear 46 may be turned in a direction opposite to arrow 51, namely in clockwise direction when viewed from the top, and the tool is then laterally displaced in the direction of dotted arrow 52'.

In addition feeding motion is provided between the tool and the blank, so that the tool completely envelopes the tooth surfaces of the gear.

The embodiment indicated in Fig. 5 differs from the just described embodiment through provision of a modified tool 54. Tool 54 contains cutting teeth 55 arranged in a row, which is parallel to the periphery of the gear blank 56. The cutting faces provided on the individual cutting teeth 55 are the same as those provided on gear blank 56, so that tooth surfaces of said rack are described by said tool in its cutting motion. The gear blank 56 is continuously rotated on its axis. The tool is moved laterally, in a direction normal to the teeth of said rack, in timed relation to the continuous rotation of the gear blank. The last named motion of the tool is reversed during the return stroke of the tool, when the tool is out of engagement with the gear blank. In addition feeding motions are provided between the tool and the gear blank.

When the gear blank is rotated in the direction of arrow 51, then the tool is laterally displaced in the direction of arrow 58, during the cutting stroke. Opposite rotation of the gear blank would call for lateral displacement of the tool in a direction 58'.

The tool motion during the cutting stroke is further illustrated in Fig. 9. Tool 54 is indicated by its rectangular outline only. The four tool positions 27b, 28b, 29b, 30b correspond to positions of the tool crank similar to the positions 27, 28, 29, 30 of Fig. 6. Position 27b corresponds to the very start of the cutting stroke, and position 30b corresponds to its end. The tool is moved in the direction 45—49 of the teeth of said rack, and in the direction of its projected cutting teeth, at a changing rate, whereas it is moved in a direction 49—53 perpendicular thereto at a constant rate, that is to say at a constant proportion to the rotation of the gear blank.

The described process may also be performed with modified tools. So a tool may be used as indicated in Fig. 10 and Fig. 11, while the same motions of tool and blank are used as just described with reference to Fig. 4, Fig. 5, Fig. 9. Tool 60 is preferably used for cutting herringbone gears of the type having continuous teeth, and may be used generally for cutting helical teeth.

The cutting teeth 61 of tool 60 also represent portions of rack teeth, having relieved sides 62, which are planes on tools for cutting involute gears. The cutting edges of a cutting tooth are formed by composite cutting faces 63, 64, and consist of a side cutting edge 65, of a top cutting edge 66, and of a side cutting edge 67 opposite to side edge 65. The inner side of herringbone teeth may be formed by side cutting edge 65, which must reach but not overrun the central plane at which the two sides of the herringbone teeth meet, and which is perpendicular to the axis of the gear blank. Side cutting edge 65 is therefore such as to be contained in said central plane at the end of the cutting strokes, and is located in a plane perpendicular to the gear axis when the tool is in cutting position. In projection it extends in the direction of the row of cutting teeth.

The cutting face portion 63 adjacent cutting edge 65 may be made a plane, which contains cutting edge 65 and which is forwardly inclined, so as to prevent formation of an excessive side rake. The plane of cutting face 63 would intersect the pitch plane of the rack represented by tool 60 in a line parallel to line 69, which is inclined at an acute angle to the direcsists in mounting a gear blank and a reciprocatory tool for engagement with each other, in continuously turning said gear blank on its axis so that each cutting tooth of said tool engages a different tooth space of said gear blank during successive cutting strokes, in imparting cutting motion to said tool by reciprocating said tool along the teeth to be cut as if said gear blank were standing still, in moving the tool at right angles to said cutting motion to allow for said continuous rotation of the gear blank, the last named motion having a constant ratio to said continuous rotation and a varying ratio to said cutting motion, in reversing the last named motion during each return stroke of the tool and after the return stroke has started, and in effecting a generating rolling motion between said tool and said gear blank.

4. The method of cutting helical teeth on gears, which consists in mounting a gear blank and a reciprocatory tool for engagement with each other, in continuously turning said gear blank on its axis so that each cutting tooth of said tool engages a different tooth space of said gear blank during successive cutting strokes, in imparting cutting motion to said tool as if said gear blank were standing still, namely along the teeth of a rack meshing with the gear to be cut from said blank, in moving said tool laterally in a straight path inclined to the periphery of said gear blank to allow for said continuous rotation of the gear blank, said lateral motion having a constant ratio to said continuous rotation and a varying ratio to said cutting motion, in reversing said lateral motion during each return stroke of the tool and after the return stroke has started, and in effecting a generating rolling motion between said tool and said gear blank.

5. The method of cutting gears, which consists in mounting a gear blank and a reciprocatory tool for engagement with each other, in continuously turning said gear blank on its axis so that each cutting tooth of said tool engages a different tooth space of said gear blank during successive cutting strokes, in imparting cutting motion to said tool as if said gear blank were standing still, namely along the teeth of a rack meshing with the gear to be cut from said blank, in moving said tool laterally to allow for said continuous rotation of the gear blank, said lateral motion having a constant ratio to said continuous rotation of the gear blank and a varying ratio to said cutting motion, in reversing said lateral motion during each return stroke of the tool and after the return stroke has started, and in effecting a generating motion between said tool and said gear blank, said generating motion consisting of a translation along a line of action and of a turning motion of said gear blank.

6. The method of cutting herringbone gears, which consists in mounting a gear blank adjacent a pair of tools, in turning said blank on its axis, in reciprocating said tools across the face width of the gear halves of opposite hand in a manner to cut in a direction towards the center of the herringbone gear blank, and in providing feeding motion between said tools and said blank in such a manner that in the central plane of the gear the tip of a cutting tooth of each tool follows the tooth profiles of the inner side of the herringbone teeth, the direction of said feeding motion being such that the cut is started at the center of the herringbone gear blank.

7. The method of cutting herringbone gears, which consists in mounting a gear blank adjacent a pair of tools, in continuously turning said blank on its axis, in reciprocating said tools in a manner to cut in a direction towards the center of the herringbone gear blank along the teeth of two racks respectively, said racks meshing with opposite halves of the herringbone gear to be cut from said blank, in moving said tools sidewise in the manner of said racks keeping in mesh with said continuously rotating gear, in reversing the last named motions of the tools during each return stroke of the respective tools and after the return stroke has started and in providing feeding motions between said tools and said blank so that the tip of a cutting tooth of each tool substantially follows the central tooth profiles of the inner side of the herringbone teeth, the direction of said feeding motions being such that the cut is started at the center of the herringbone gear blank.

8. A tool slide for gear cutting machines, comprising a slide body provided with means for engaging straight guides, a pivot disposed transversely to the direction of intended motion of said slide, a tool holder turnable on said pivot, projections for journalling a gear having an axis parallel to said direction, another gear meshing with the first named gear and being coaxial with said pivot, and an operative connection between said other gear and said tool holder for moving said tool holder lengthwise of said pivot in proportion to the turning motion of said other gear.

9. A tool slide for gear cutting machines, comprising a slide body provided with guide engaging means, means for mounting a reciprocatory tool on said slide, and automatic means for sweeping the cutting face of said tool after each cutting stroke.

10. A tool slide for gear cutting machines, comprising a slide body movable in the direction of the teeth to be cut, means for reciprocating said slide body in said direction to provide cutting strokes alternating with return strokes, a tool holder, means for moving said tool holder laterally on said slide body at an angle to said direction, and timing means for reversing the last named motion of the tool holder during each return stroke of said slide body and after said return stroke has already started.

11. A tool slide for gear cutting machines, comprising a slide body movable in the direction of the teeth to be cut, means for reciprocating said slide body in said direction so as to provide cutting strokes of changing speed alternating with return strokes, a pivot disposed transversely to said direction on said slide body, a tool holder turnable on said pivot, means for moving said tool holder lengthwise of said pivot, and timing means for reversing the direction of the last named motion during each return stroke of said slide body and after said return stroke has already started.

12. A tool slide for gear cutting machines, comprising a slide body movable in the direction of the teeth to be cut, means for reciprocating said slide body in said direction so as to provide cutting strokes of changing speed alternating with return strokes, a pivot disposed at right angles to said direction on said slide body, a tool holder turnable on said pivot, means for moving said tool holder at a constant speed lengthwise of said pivot, and timing means for reversing the direction of the last named motion during each return stroke of said slide body and after said return stroke has already started.

13. A tool slide for gear cutting machines adapted to generate helical teeth, comprising a slide body movable in the direction of the helical teeth to be cut, means for reciprocating said slide body in said direction so as to provide cutting strokes alternating with return strokes, a pivot disposed on said slide body at right angles to said direction and at an angle to the peripheral direction of the gear to be generated, a tool holder turnable on said pivot, means for moving said tool holder lengthwise of said pivot, and timing means for reversing the last named motion of the tool holder during each return stroke of said slide body and after said return stroke has already started.

14. A tool slide for gear cutting machines, comprising a slide body movable in a straight path, means for reciprocating said slide body, a tool holder pivoted on said slide body for holding a cutting tool, means for automatically sweeping the cutting face of said tool after each cutting stroke, said sweeping means being pivoted on said slide body on an axis parallel to the pivot of said tool holder, and spring means for maintaining said sweeping means in engagement with said cutting face, so that said cutting face is swept during each disengagement of the tool from the gear being cut.

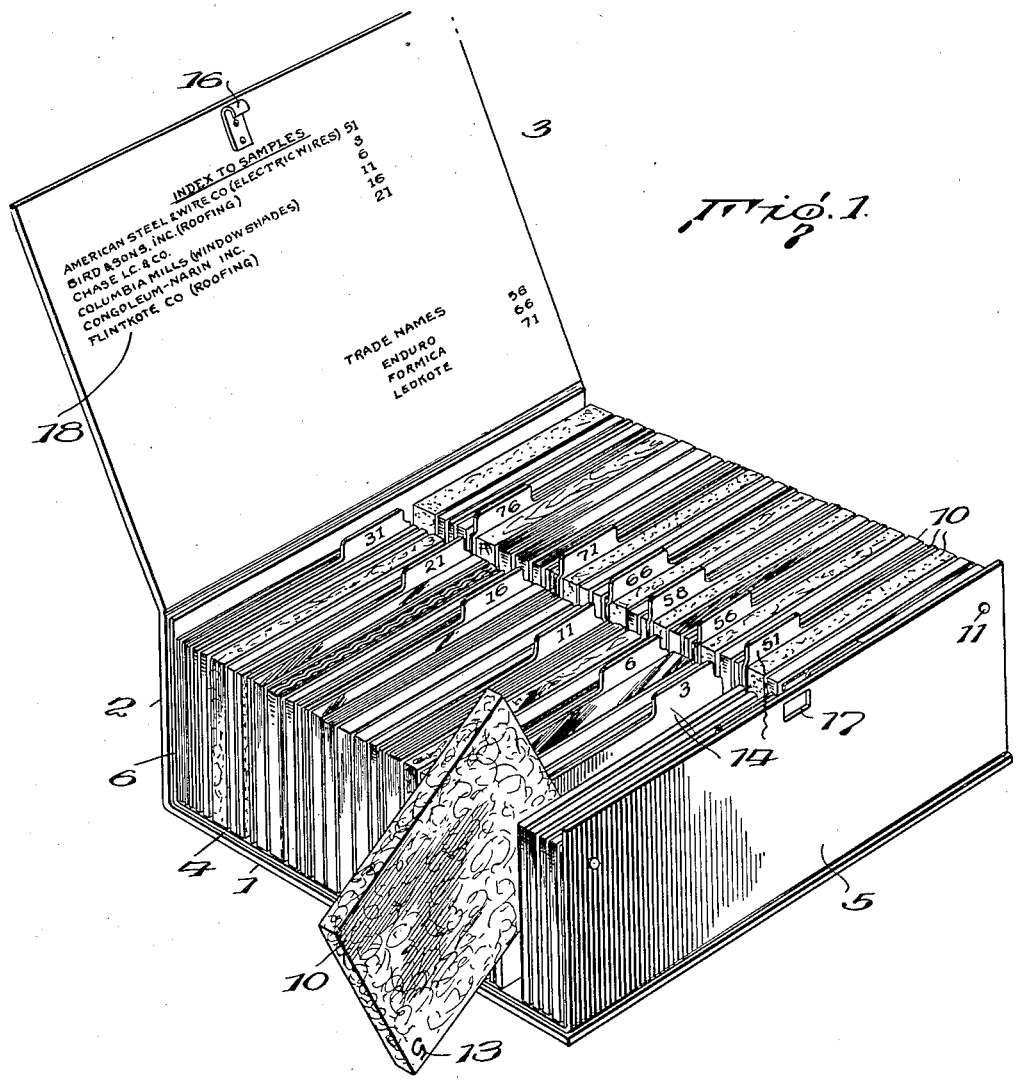

ERNEST WILDHABER.